(12) United States Patent
Yang et al.

(10) Patent No.: US 10,201,007 B2
(45) Date of Patent: *Feb. 5, 2019

(54) METHOD FOR TRANSRECEIVING SIGNAL AND APPARATUS FOR SAME

(71) Applicant: LG ELECTRONICS INC., Seoul (KR)

(72) Inventors: Suckchel Yang, Seoul (KR); Yunjung Yi, Seoul (KR); Joonkui Ahn, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,076

(22) Filed: Jun. 1, 2017

(65) Prior Publication Data

US 2017/0273104 A1    Sep. 21, 2017

Related U.S. Application Data

(63) Continuation of application No. 14/760,971, filed as application No. PCT/KR2014/001038 on Feb. 6, 2014, now Pat. No. 9,706,567.

(Continued)

(51) Int. Cl.
*H04W 72/12* (2009.01)
*H04W 88/02* (2009.01)
(Continued)

(52) U.S. Cl.
CPC ....... *H04W 72/1289* (2013.01); *H04L 1/1812* (2013.01); *H04L 1/1854* (2013.01);
(Continued)

(58) Field of Classification Search
CPC ............. H04W 72/12; H04W 72/1205; H04W 72/1263; H04W 72/1278
See application file for complete search history.

(56) References Cited

U.S. PATENT DOCUMENTS

2009/0213769 A1    8/2009  Shen et al.
2010/0075690 A1*   3/2010  Wu ................... H04W 72/042
                                                              455/452.1
(Continued)

FOREIGN PATENT DOCUMENTS

CN    101606347 A    12/2009
CN    101946447 A     1/2011
(Continued)

OTHER PUBLICATIONS

Author Unknown, Overhead reduction for spectrum efficiency improvement, 3GPP TSG RAN WG1 Meeting #72, Doc. No. R1-130057, Feb. 1, 2013, pp. 1-4.*

(Continued)

*Primary Examiner* — Christopher M Crutchfield
(74) *Attorney, Agent, or Firm* — Birch, Stewart, Kolasch & Birch, LLP

(57) ABSTRACT

A method for receiving a signal by a user equipment in a wireless communication system, the method includes detecting downlink control information (DCI) within a subframe indicated by a radio resource control (RRC) layer signal; and receiving, based on the DCI, a data signal in K consecutive subframes other than at least one subframe corresponding to a specific subframe, wherein K is greater than 1, wherein the specific subframe includes at least a subframe transmitting a physical broadcast channel (PBCH), a subframe transmitting a synchronization signal, and a subframe transmitting system information, and wherein the DCI is not applied to the at least one subframe.

16 Claims, 12 Drawing Sheets

Related U.S. Application Data

(60) Provisional application No. 61/837,150, filed on Jun. 19, 2013, provisional application No. 61/821,252, filed on May 9, 2013, provisional application No. 61/808,616, filed on Apr. 4, 2013, provisional application No. 61/786,554, filed on Mar. 15, 2013, provisional application No. 61/761,239, filed on Feb. 6, 2013.

(51) Int. Cl.
*H04L 5/14* (2006.01)
*H04L 5/00* (2006.01)
*H04L 1/18* (2006.01)

(52) U.S. Cl.
CPC .......... *H04L 5/0055* (2013.01); *H04L 5/0092* (2013.01); *H04L 5/14* (2013.01); *H04W 72/12* (2013.01); *H04W 72/1205* (2013.01); *H04L 5/0048* (2013.01); *H04W 88/02* (2013.01)

(56) References Cited

U.S. PATENT DOCUMENTS

| | | |
|---|---|---|
| 2010/0195587 A1 | 8/2010 | Ratasuk et al. |
| 2011/0070845 A1 | 3/2011 | Chen et al. |
| 2011/0170496 A1 | 7/2011 | Fong et al. |
| 2011/0268059 A1 | 11/2011 | Li et al. |
| 2012/0033587 A1 | 2/2012 | Papasakellariou et al. |
| 2012/0039275 A1 | 2/2012 | Chen et al. |
| 2012/0208583 A1 | 8/2012 | Chung et al. |
| 2012/0236771 A1 | 9/2012 | Luo et al. |
| 2012/0281646 A1* | 11/2012 | Liao .................... H04W 72/042 370/329 |
| 2013/0016686 A1 | 1/2013 | Li et al. |
| 2013/0028205 A1* | 1/2013 | Damnjanovic ......... H04L 5/001 370/329 |
| 2013/0039387 A1 | 2/2013 | Qu |
| 2013/0051355 A1 | 2/2013 | Hong |
| 2013/0121130 A1 | 5/2013 | Ko et al. |
| 2013/0170407 A1 | 7/2013 | Liang et al. |
| 2013/0215803 A1 | 8/2013 | Lee et al. |
| 2013/0265914 A1 | 10/2013 | Ahn et al. |
| 2014/0161088 A1 | 6/2014 | Seo et al. |
| 2014/0185539 A1 | 7/2014 | Seo et al. |
| 2014/0226649 A1* | 8/2014 | Webb .................... H04L 5/0023 370/350 |
| 2014/0233541 A1 | 8/2014 | Kim et al. |
| 2015/0103704 A1* | 4/2015 | Skov ................. H04W 72/0446 370/280 |
| 2015/0146588 A1 | 5/2015 | Park |
| 2015/0189622 A1 | 7/2015 | Jang et al. |

FOREIGN PATENT DOCUMENTS

| | | | |
|---|---|---|---|
| CN | 102106096 A | 6/2011 | |
| CN | 102202408 A | 9/2011 | |
| CN | 102237992 A | 9/2011 | |
| EP | 2434818 A1 | 3/2012 | |
| EP | 2538734 A1 * | 12/2012 | .......... H04L 1/1822 |
| EP | 2538734 A1 | 12/2012 | |
| KR | 10-2011-0103457 A | 9/2011 | |
| KR | 10-2011-0122033 A | 11/2011 | |
| WO | WO 2012/064078 A2 | 5/2012 | |
| WO | WO 2012/081867 A2 | 6/2012 | |
| WO | WO 2012/124923 A2 | 9/2012 | |
| WO | WO 2012/138149 A2 | 10/2012 | |
| WO | WO 2013/015613 A2 | 1/2013 | |
| WO | WO 2014/137525 A1 | 9/2014 | |

OTHER PUBLICATIONS

LTE in Bullets, Second Edition, Section 5.1.1, 2012, pp. 1-3.*
Author Unknown, TS 36.211, V 11.1.0, pp. 1-106, Sep. 2012.*
China Telecom, "Discussion on spectral efficiency improvement for small cell enhancements", 3GPP TSG RAN WG1 Meeting #72, R1-1430354, St. Julian's, Malta, Jan. 28-Feb. 1, 2013, pp. 1-7.
New Postcom, "Evaluation assumptions for enhancement for UE-specific RS and control signaling", 3GPP TSG RAN WG1 Meeting #72, R1-130186, St. Julian's, Malta, Jan. 28-Feb. 1, 2013, 6 pages.
Author Unknown, "Analysis and initial evaluation results for overhead reduction and control signaling enhancements", 3GPP TSG RAN WG1 Meeting #72, Doc. No. R1-130022, Feb. 1, 2013, pp. 1-6.
Author Unknown, "Correction to EPDCCH monitoring subframes", 3GPP TSG-RAN WG1 Meeting #72, Doc. No. R1-130360, pp. 1-3, Feb. 1, 2013.
Author Unknown, "LTE Evolved Universal Terrestrial Radio Access (E-UTRA); Physical channels and modulation", 3GPP TS 36.211 version 10.0.0, pp. 1-105, Jan. 2011.
Author Unknown, "Overhead Reduction", 3GPP TSG RAN WG1 Meeting #72, Doc. No. R1-130594, Feb. 1, 2013, pp. 1-4.
Ericsson, "Remaining Issues for TDD ACK/NAK bundling and PUSCH," TSG-RAN WG1 #53bis, R1-082462, Warsaw, Poland, Jun. 30-Jul. 4, 2008, 4 pages, XP050110733.
Huawei et al., "PDCCH enhancement in Rel-11 carrier aggregation," 3GPP TSG RAN WG1 Meeting #66, R1-112461, Athens, Greece, Aug. 22-26, 2011, 2 pages, XP050537553.
A Chinese Office Action and Search Report, dated Sep. 30, 2017, for Chinese Application No. 201480007350.9 is provided, as well as an English translation of the Chinese Office Action.

* cited by examiner

FIG. 8
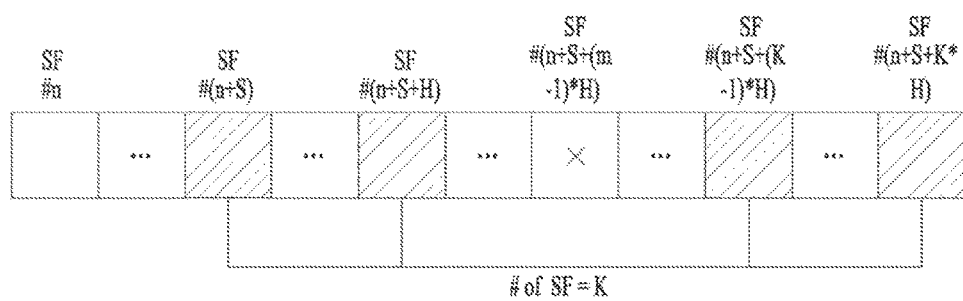
(a) SF-skipping
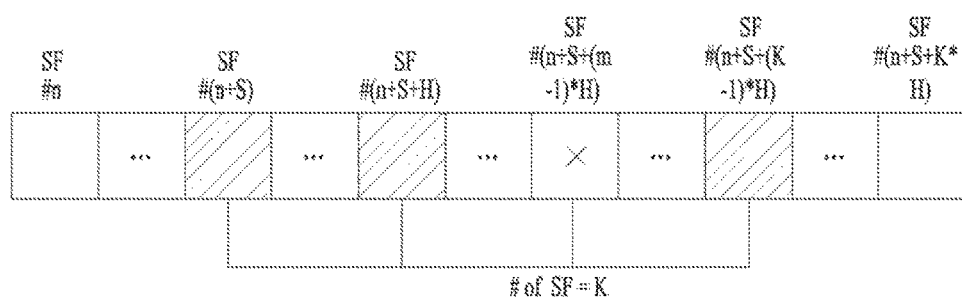
(b) SF-omitting
 Special X-SF and / or indicated-O SF
 Multi-SF scheduled SF

| | $k_0$ comb(10-$k_0$, 4-0) | $k_1$ comb(10-$k_1$, 4-1) | $k_2$ comb(10-$k_2$, 4-2) | $k_3$ comb(10-$k_3$, 4-3) |
|---|---|---|---|---|
| 1 | 126 | 84 | 36 | 9 |
| 2 | (70) | 56 | 28 | 8 |
| 3 | 35 | (35) | 21 | 7 |
| 4 | 15 | 20 | 15 | 6 |
| 5 | 5 | 10 | (10) | 5 |
| 6 | 1 | 4 | 6 | 4 |
| 7 | 0 | 1 | 3 | 3 |
| 8 | 0 | 0 | 1 | (2) |
| 9 | 0 | 0 | 0 | 1 |
| 10 | 0 | 0 | 0 | 0 | maxHARQp = 10
K = 4

NON-AVAILABLE REGION ex) When k0=2, k1=3, k2=5, k3=8, (r = 70 + 35 + 10 + 2 = 117)

FIG. 11
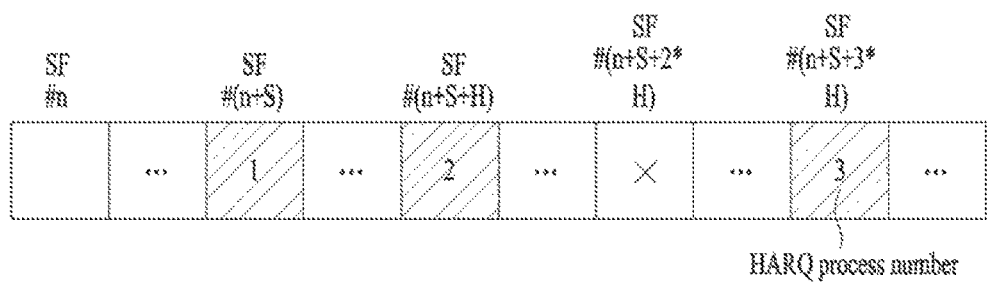
(a) First example
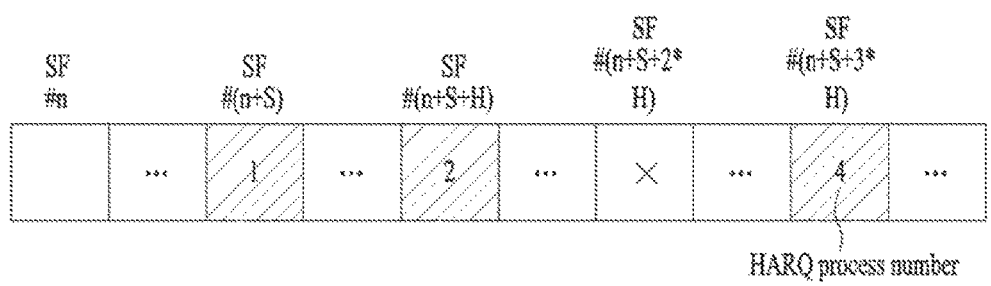
(b) Second example
 Special X-SF and / or indicated-O SF
 Multi-SF scheduled SF

METHOD FOR TRANSRECEIVING SIGNAL AND APPARATUS FOR SAME

CROSS-REFERENCE TO RELATED APPLICATIONS

This application is a Continuation of U.S. patent application Ser. No. 14/760,971 flied on Jul. 14, 2015 (now, U.S. Pat. No. 9,706,567 issued on Jul. 11, 2017), which is the National Phase of PCT International Application No. PCT/KR2014/001038 flied on Feb. 6, 2014, which claims the benefit under 35 U.S.C. § 119(e) to U.S. Provisional Application Nos. 61/837,150 filed on Jun. 19, 2013, 61/821,252 filed on May 9, 2013, 61/808,616 filed on Apr. 4, 2013, 61/786,554 filed on Mar. 15, 2013 and 61/761,239 filed on Feb. 6, 2013, all of which are hereby expressly incorporated by reference into the present application.

BACKGROUND OF THE INVENTION

Field of the Invention

The present invention relates to a wireless communication system, more specifically, relates to a method for scheduling a plurality of data signals and an apparatus therefor.

Discussion of the Related Art

Wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY OF THE INVENTION

An object of the present invention is to provide a method and apparatus for effectively transmitting and receiving a signal in a wireless communication system.

Another object of the present invention is to provide a signaling method and apparatus for effectively scheduling a plurality of data signals in a wireless communication system.

Another object of the present invention is to provide a method and apparatus for effectively allocating a hybrid automatic repeat and request (HARQ) process number when a plurality of data signals is scheduled using one control information in a wireless communication system.

Another object of the present invention is to provide a method and apparatus for effectively applying control information when control information for a single data signal is detected/received in a time period scheduled by control information for scheduling a plurality of data signals in a wireless communication system.

It is to be understood that both the foregoing general description and the following detailed description of the present invention are exemplary and explanatory and are intended to provide further explanation of the invention as claimed.

In an aspect of the present invention, provided herein is a method for receiving a signal by a user equipment in a wireless communication system, the method comprising: receiving downlink control information comprising scheduling information about K subframes through a physical downlink control channel, wherein K is greater than 1, wherein when at least one subframe among the K subframes corresponds to a specific subframe, the scheduling information is not applied to the at least one subframe, and wherein the specific subframe includes at least a subframe configured for a multicast-broadcast single-frequency network (MBSFN), or a subframe configured to receive a physical multicast channel (PMCH), or a subframe configured to transmit a positioning reference signal (PRS), or a subframe comprising a downlink period, a guard period, and an uplink period.

In another aspect of the present invention, provided herein is a user equipment of a wireless communication system, the user equipment comprising: a radio frequency (RF) unit; and a processor, wherein the processor is configured to receive downlink control information comprising scheduling information about K subframes through a physical downlink control channel by the RF unit, wherein K is greater than 1, wherein when at least one subframe among the K subframes corresponds to a specific subframe, the scheduling information is not applied to the at least one subframe, and wherein the specific subframe includes at least a subframe configured for a multicast-broadcast single-frequency network (MBSFN), or a subframe configured to receive a physical multicast channel (PMCH), or a subframe configured to transmit a positioning reference signal (PRS), or a subframe comprising a downlink period, a guard period, and an uplink period.

Preferably, the specific subframe may further include a subframe in which a physical broadcast channel (PBCH) signal is transmitted, or a subframe configured to transmit system information, or a subframe configured to transmit a paging signal, or a subframe configured to transmit a synchronization signal, or a subframe configured to perform semi-persistent scheduling, or a subframe configured to enable transmission of a physical random access channel (PRACH), or a subframe configured not to transmit a demodulation reference signal (DMRS), or a subframe configured to transmit a channel state information-reference signal (CSI-RS).

Preferably, the scheduling information may be applied to K subframes except for the at least one subframe.

Preferably, the scheduling information may be applied to M subframes except for the at least one subframe, and M may be smaller than K.

Preferably, the downlink control information may further include information indicating a subframe to which the scheduling is not applied among the K subframes, and the specific subframe may further include a subframe indicated such that the scheduling information is not applied through the downlink control information.

Preferably, the downlink control information may further include information indicating whether the downlink control information is applied to the K subframes or applied to only a subframe in which the downlink information is received.

Preferably, M data signals may be received using the scheduling information, M may be equal to or smaller than K, and different hybrid automatic repeat request (HARQ) process numbers may be allocated to the M data signals.

Preferably, the HARQ process number may be pre-allocated through high layer signaling.

Preferably, the downlink control information may further include a field indicating the HARQ process number, the HARQ process number may be consecutively and increasingly allocated from a value of the field and is determined by applying a modulo operation using the allocated value as a specific value, and the specific value may be a maximum number of HARQ processes or a maximum number of HARQ process receive buffer, supported by the user equipment.

Preferably, the downlink control information may further include index information indicating the HARQ process number, and the index uniquely determines a set of the HARQ process number.

Preferably, when a set of the HARQ process number is $\{k_i\}_{i=0}^{K-1}$, the index information may be given according to $$r = \sum_{i=0}^{K-1} \binom{maxHARQp - k_i}{K - i},$$

and maxHARQp is a maximum number of HARQ processes or a maximum number of HARQ process receive buffers supported by the user equipment, $$\binom{x}{y} = \begin{cases} \binom{x}{y} & x \geq y \\ 0 & x < y \end{cases}, \text{ and } \binom{x}{y}$$

is a binominal coefficient.

Preferably, blind decoding (BD) may not be performed on the K subframes to which the downlink control information is applied.

Preferably, when other downlink control information is detected in one subframe of the K subframes, a data signal may be received according to the other downlink control information with respect to the one subframe.

Preferably, an operation of receiving a data signal according to the downlink control information may be omitted with respect to a subframe after the one subframe in the K subframes.

According to the present invention, a signal may be effectively transmitted and received in a wireless communication system.

According to the present invention, a plurality of data signals may be effectively scheduled in a wireless communication system.

According to the present invention, a hybrid automatic repeat and request (HARQ) process number may be effectively allocated when a plurality of data signals is scheduled using one control information in a wireless communication system.

In addition, according to the present invention, control information may be effectively applied when control information for a single data signal is detected/received in a time period scheduled by control information for scheduling a plurality of data signals in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 8 illustrates a multi-SF scheduling method according to the present invention.

FIG. 11 illustrates an example of allocating a HARQ process when an omitted SF is present.

DETAILED DESCRIPTION OF THE INVENTION

The following embodiments of the present invention may be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be implemented by wireless (or radio) technology such as Institute of Electrical and Electronics Engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3$^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical spirit of the present invention. For example, the present invention may be applied to a system in accordance with a 3GPP LTE/LTE-A system as well as a system in accordance with another 3GPP standard, IEEE 802.xx standard, or 3GPP2 standard.

In a wireless access system, a UE may receive information from a BS in downlink (DL) and transmit information in uplink (UL). The information transmitted or received by the UE may include data and various control information. In addition, there are various physical channels according to the type or use of the information transmitted or received by the UE.

In the present invention, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present invention, a BS may be interchangeably referred to as an eNB.

Figure 1:
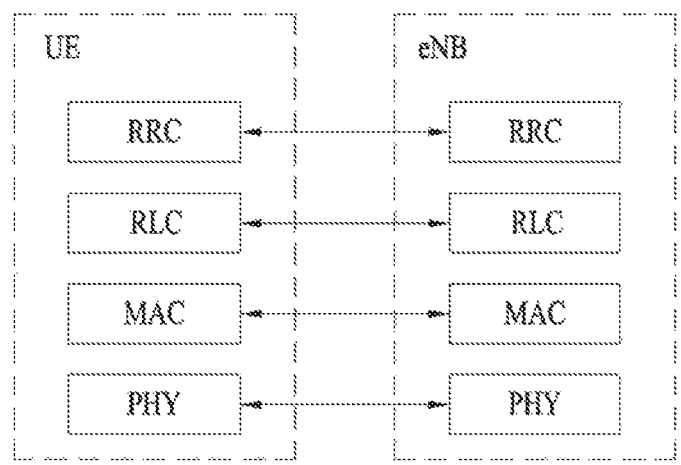
FIG. 1 illustrates layers of a radio protocol.

FIG. 1 illustrates layers of a radio protocol.

The physical layer (PHY) which is a first layer provides information transfer services to the upper layers using a physical channel. The PHY layer is connected to the upper medium access control (MAC) layer through a transport channel, and data between the MAC layer and the PHY layer is transferred through the transport channel. In this case, the transport channel is roughly divided into a dedicated transport channel and a common transport channel based on whether or not the channel is shared. Furthermore, data is transferred between different PHY layers, i.e., between PHY layers at transmitter and receiver sides.

A second layer may include various layers. The medium access control (MAC) layer serves to map various logical channels to various transport channels, and also performs logical channel multiplexing for mapping several logical channels to one transport channel. The MAC layer is connected to a radio link control (RLC) layer, which is an upper layer, through a logical channel, and the logical channel is roughly divided into a control channel for transmitting control plane information and a traffic channel for transmitting user plane information according to the type of information to be transmitted.

The RLC layer of the second layer manages segmentation and concatenation of data received from an upper layer to appropriately adjusts a data size such that a lower layer can send data to a radio section. Also, the RLC layer provides three operation modes such as a Transparent Mode (TM), an Un-acknowledged Mode (UM), and an Acknowledged Mode (AM) so as to guarantee various Quality of Services (QoS) required by each Radio Bearer (RB). In particular, AM RLC performs a retransmission function through an ARQ function for reliable data transmission.

A radio resource control (RRC) layer located at the uppermost portion of a third layer is only defined in the control plane. The RRC layer performs a role of controlling logical channels, transport channels, and physical channels in relation to configuration, re-configuration, and release of radio bearers. Here, the radio bearer denotes a logical path provided by the first and the second layers for transferring data between the UE and the UTRAN. In general, the configuration of the radio bearer refers to a process of stipulating the characteristics of protocol layers and channels required for providing a specific service, and setting each of the detailed parameter and operation methods thereof. The radio bearer is divided into a signaling radio bearer (SRB) and a data radio bearer (DRB), wherein the SRB is used as a path for transmitting RRC messages in the control plane while the DRB is used as a path for transmitting user data in the user plane.

In a wireless access system, a user equipment (UE) may receive information from a base station (BS) in downlink (DL) and transmit information in uplink (UL). The information transmitted or received by the UE may include general data information and various control information. In addition, there are various physical channels according to the type or use of the information transmitted or received by the UE.

Figure 2:
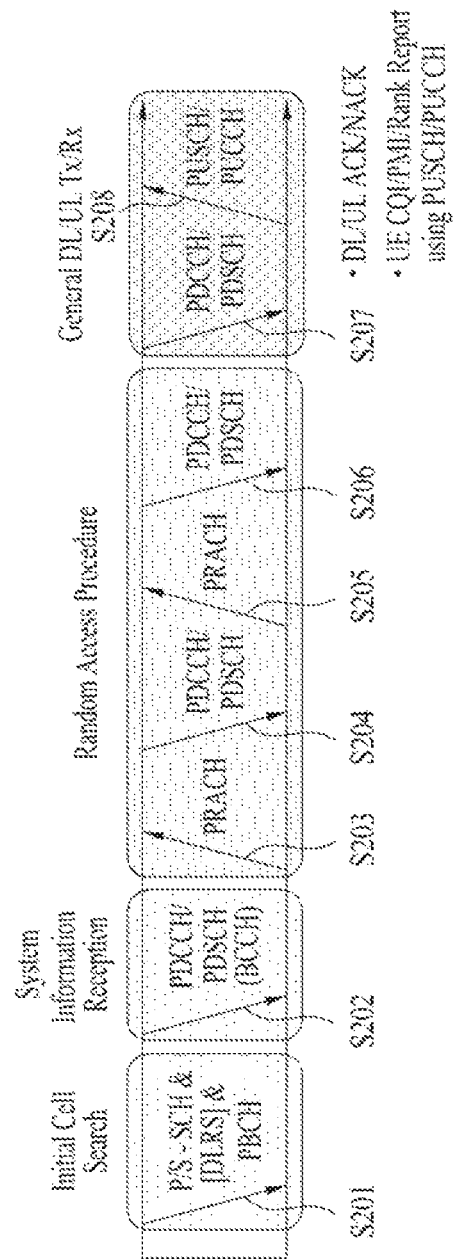
FIG. 2 illustrates physical channels and a general method for transmitting signals on the physical channels in the LTE(-A) system.

FIG. 2 illustrates physical channels and a general method for transmitting signals on the physical channels in the LTE(-A) system.

When a UE is powered on or enters a new cell, the UE performs initial cell search in step S201. The initial cell search involves acquisition of synchronization to a base station. To this end, the UE synchronizes its timing to the base station and acquires information such as a cell identifier (ID) by receiving a primary synchronization channel (P-SCH) and a secondary synchronization channel (S-SCH) from the base station. Then the UE may acquire broadcast information in the cell by receiving a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S202.

To complete access to the base station, the UE may perform a random access procedure such as steps S203 to S206 with the base station. To this end, the UE may transmit a preamble on a physical random access channel (PRACH) (S203) and may receive a response message to the preamble on a PDCCH and a PDSCH associated with the PDCCH (S204). In the case of a contention-based random access, the UE may additionally perform a contention resolution procedure including transmission of an additional PRACH (S205) and reception of a PDCCH signal and a PDSCH signal corresponding to the PDCCH signal (S206).

After the above procedure, the UE may receive a PDCCH and/or a PDSCH from the base station (S207) and transmit a physical uplink shared channel (PUSCH) and/or a physical uplink control channel (PUCCH) to the base station (S208), in a general UL/DL signal transmission procedure. Information that the UE transmits to the base station is referred to as Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 3:
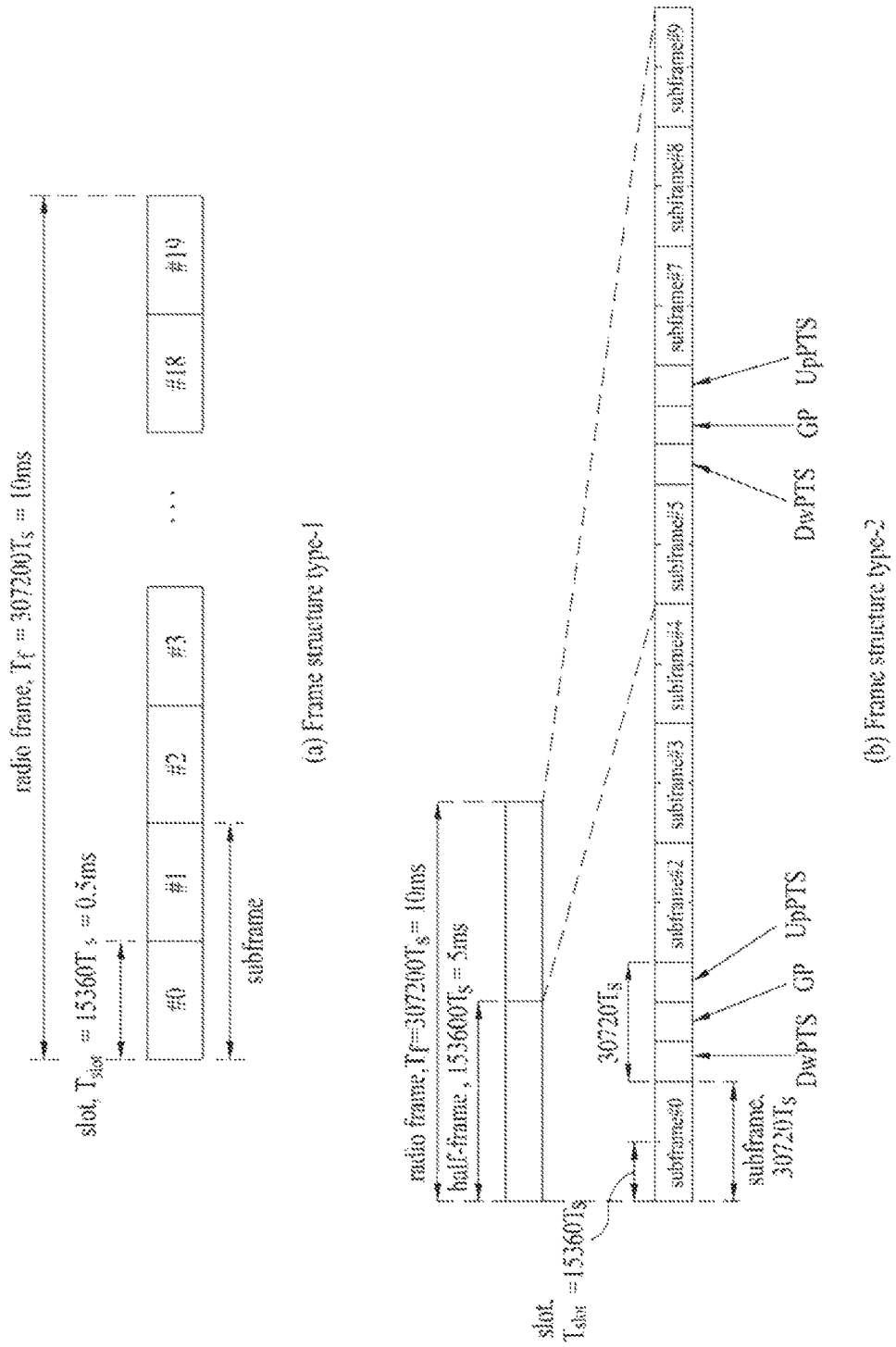
FIG. 3 illustrates a structure of a radio frame used in the LTE(-A) system.

FIG. 3 illustrates a structure of a radio frame used in the LTE(-A) system. In a cellular OFDM radio packet communication system, uplink/downlink data packet transmission is performed in the unit of a subframe (SF), and one subframe is defined as a predetermined duration including a plurality of OFDM symbols. The LTE(-A) system supports a type-1 radio frame structure applicable to frequency division duplex (FDD) and a type-2 radio frame structure applicable to time division duplex (TDD).

FIG. 3(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol duration. In the LTE(-A) system, since SC-FDMA is used in uplink, an OFDM symbol may be referred to as an SC-FDMA symbol in the present specification, and also may be collectively referred to as a symbol duration. A resource block (RB) as a resource assignment unit may include a plurality of consecutive subcarriers in one slot. A subframe used for a downlink communication is referred to as a downlink subframe, and may be represented by DL SF. A subframe used for an uplink communication is referred to as an uplink subframe, and may be represented by UL SF.

The length of one symbol duration (or the number of OFDM symbols included in one slot) may vary according to a configuration of cyclic prefix (CP). The cyclic prefix refers to repeating a portion of symbol (e.g. the last portion of symbol) or the entire symbol and placing the repeated portion in front of the symbol. The cyclic prefix (CP) includes an extended CP and a normal CP. For example, if OFDM symbols are configured by the normal CP, the number of OFDM symbols included in one slot may be 7. In case of the extended CP, for example, the number of OFDM symbols included in one slot may be 6.

FIG. 3(b) illustrates a structure of the type-2 radio frame. The type-2 radio frame includes two half frames, and each half frame includes five subframes, a downlink period (e.g. a downlink pilot time slot or DwPTS), a guard period (GP) and an uplink period (e.g. an uplink pilot time slot or UpPTS). One subframe includes two slots. For example, the downlink period (e.g., DwPTS) is used for initial cell search, synchronization or channel estimation of a UE. For example, the uplink period (e.g., UpPTS) is used for channel estimation of a BS and uplink transmission synchronization of a UE. For example, the uplink period (e.g., UpPTS) may be used to transmit a sounding reference signal (SRS) for channel estimation in a base station and to transmit a physical random access channel (PRACH) that carriers a random access preamble for uplink transmission synchronization. The guard period is used to eliminate interference generated in uplink due to multi-path delay of a downlink signal between uplink and downlink. Table 1 shows an example of an uplink-downlink (UL-DL) configuration of subframes within a radio frame in a TDD mode.

TABLE 1

| Uplink-downlink configuration | Downlink-to-Uplink Switch-point periodicity | \multicolumn{10}{c}{Subframe number} |||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a downlink subframe (DL SF), Ii represents an uplink subframe (UL SF), and S represents a special subframe. The special subframe includes a downlink period (e.g. DwPTS), a guard period (e.g. GP), and an uplink period (e.g. UpPTS). Table 2 shows an example of a special subframe configuration.

TABLE 2

| | \multicolumn{3}{c}{Normal cyclic prefix in downlink} ||| \multicolumn{3}{c}{Extended cyclic prefix in downlink} |||
|---|---|---|---|---|---|---|
| | | \multicolumn{2}{c}{UpPTS} || | \multicolumn{2}{c}{UpPTS} ||
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described radio frame structure is exemplary. Thus, the number of subframes in a radio frame, the number of slots in a subframe, or the number of symbols in a slot may be modified in various ways.

Figure 4:
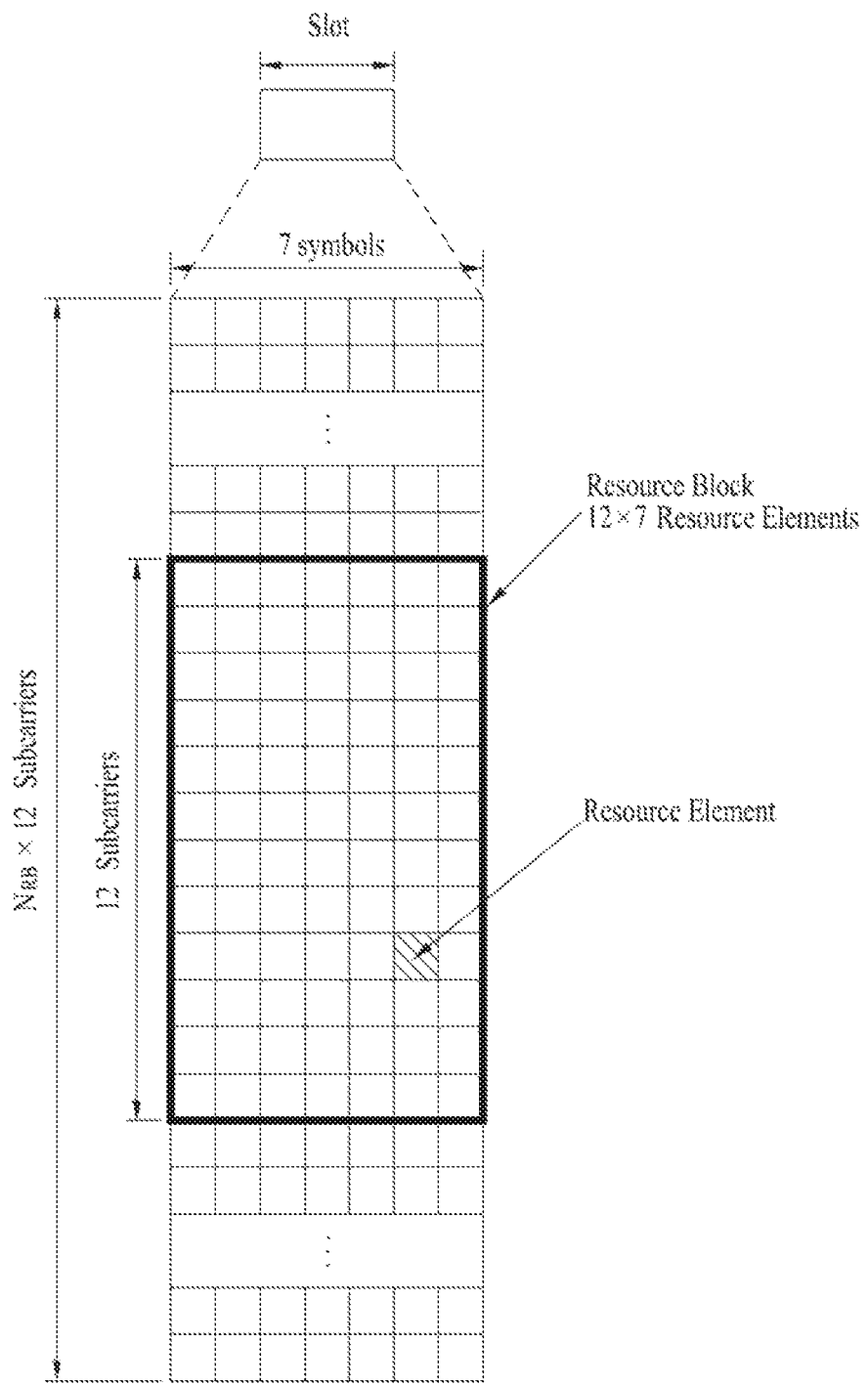
FIG. 4 illustrates a resource grid of one downlink slot.

FIG. 4 illustrates a resource grid of one downlink slot.

Referring to FIG. 4, a downlink slot includes a plurality of OFDM symbols in the time domain. One downlink slot may include 7 OFDM symbols and one resource block (RB) may include 12 subcarriers in the frequency domain. An example as illustrated in FIG. 4 may be applied to a normal CP case, while one downlink slot may include 6 OFDM symbols in the time domain in case of an extended CP case. Each element of the resource grid is referred to as a Resource Element (RE). An RB includes 12×7 REs. The number of RBs in a downlink slot, $N_{DL}$ depends on a downlink transmission bandwidth. The structure of an uplink slot may have the same structure as a downlink slot.

Figure 5:
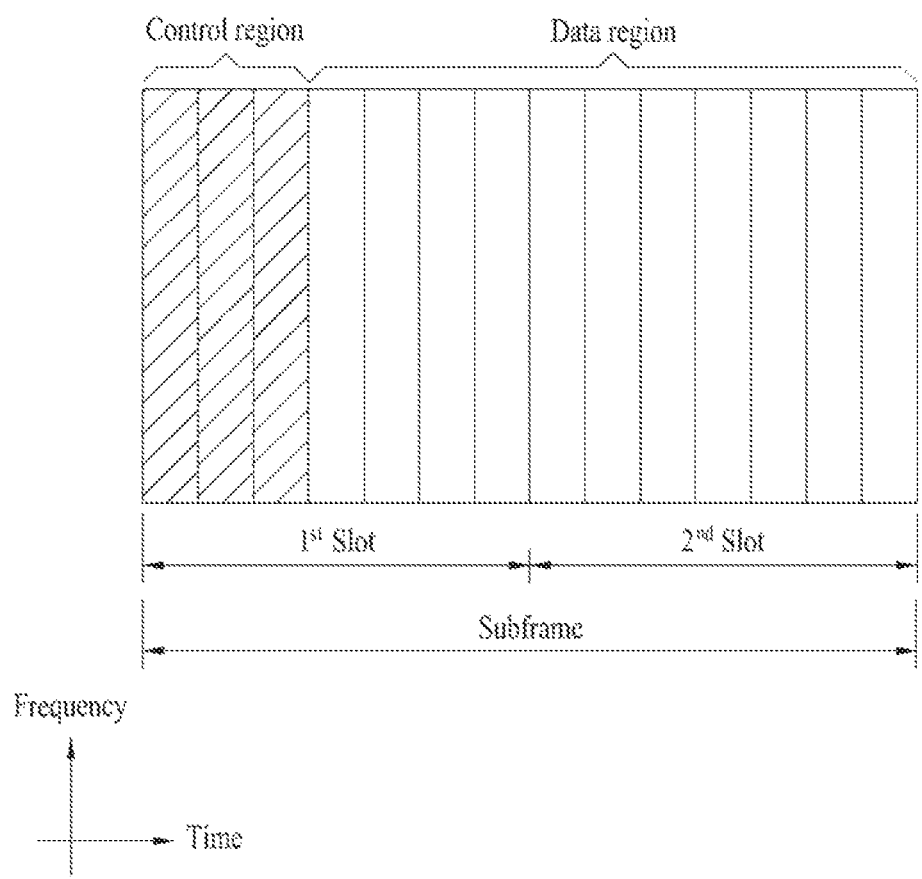
FIG. 5 illustrates a downlink subframe structure.

FIG. 5 illustrates a downlink subframe structure.

Referring to FIG. 5, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first OFDM symbol of a subframe and carries information regarding the number of OFDM symbols used for transmission of control channels within the subframe. The PCFICH is composed of four resource element groups (REGs) each of which is uniformly distributed in a control region based on a cell ID. The PCFICH indicates a value of 1 to 3 (or 2 to 4) and is modulated using quadrature phase shift keying (QPSK).

PDCCH carries a transmission format or resource allocation information of downlink shared channel (DL-SCH), a transmission format or resource allocation information of uplink shared channel (UL-SCH), paging information on paging channel (PCH), system information on DL-SCH, resource allocation information of an upper layer control message such as random access response transmitted on PDSCH, a set of Tx power control commands for individual UEs within a UE group, Tx power control command, activation indication information of Voice over IP (VoIP), etc. The PDCCH is allocated in the first n OFDM symbols (hereinafter, a control region) of a subframe. Here, n is an integer equal to or greater than 1 and is indicated by the PCFICH. Control information transmitted through the PDCCH is referred to as downlink control information (DCI). DCI format is defined as formats 0, 3, 3A, and 4 for uplink and defined as formats 1, 1A, 1B, 1C, 1D, 2, 2A, 2B, 2C, and 2D for downlink. For example, DCI format may selectively include exemplary fields shown in Table 3. In Table 3, a bit size of each information field is a non-limiting example.

TABLE 3

| Field | Bit(s) |
|---|---|
| Flag for determining DCI format 0/1 A | 1 |
| Hopping flag | 1 |
| RB assignment | $\lceil \log_2(N_{RB}^{UL}(N_{RB}^{UL} + 1)/2) \rceil$ |
| MCS (Modulation and coding scheme) and RV (Redundancy Version) | 5 |

TABLE 3-continued

| Field | Bit(s) |
|---|---|
| NDI (New Data Indicator) | 1 |
| TPC (Transmit Power Control) command for scheduled PUSCH | 2 |
| Cyclic shift for DM RS | 3 |
| UL index (TDD) | 2 |
| CQI request | 1 |

The flag field is an information field for identifying between DCI format 0 and DCI format 1A. That is, DCI format 0 and DCI format 1A have the same payload size and are identified by the flag field. The bit size of the resource block allocation and hopping resource allocation field may vary according to hopping PUSCH or non-hopping PUSCH. The resource block allocation and hopping resource allocation field for the non-hopping PUSCH provides $\lceil \log_2(N_{RB}^{UL}(N_{RB}^{UL}+1)/2) \rceil$ bits for resource allocation of the first slot in an uplink subframe. Here, $N_{RB}^{UL}$ denotes the number of RBs included in an uplink slot and depends upon an uplink transmission bandwidth set in a cell. Accordingly, the payload size of DCI format 0 may depend upon uplink bandwidth. DCI format 1A includes an information field for PDSCH allocation. The payload size of DCI format 1A may depend upon downlink bandwidth. DCI format 1A provides a reference information bit size for DCI format 0. Accordingly, DCI format 0 is padded with '0' until the payload size of DCI format 0 becomes identical to the payload size of DCI format 1A when the number of information bits of DCI format 0 is less than the number of information bits of DCI format 1A. The added '0' is filled in a padding field of DCI format.

The TPC field includes a power control command or value for PUSCH transmission, PUCCH transmission, or PRACH transmission at a UE. The TPC field is given by an absolute value or a relative value. The relative value may be accumulated to the current value of transmission power. When the current value of transmission power is the maximum transmission power of UE, a positive value of TPC may not be accumulated. When the current value of transmission power is the minimum transmission power of UE, a negative value of TPC may not be accumulated.

A base station determines a PDCCH format according to DCI to be transmitted to a UE, and attaches a cyclic redundancy check (CRC) to control information. The CRC is masked with an identifier (e.g. a radio network temporary identifier (RNTI)) according to an owner or usage of the PDCCH. For example, if the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A plurality of PDCCHs may be transmitted within one subframe. A UE may monitor the plurality of PDCCHs. PDCCH is transmitted on an aggregation of one or several consecutive control channel elements (CCEs). A CCE is a logical allocation unit used to provide the PDCCH with a coding rate based on a state of a radio channel. The CCE corresponds to a plurality of resource element groups (REGs).

The LTE(-A) system defines a limited set of CCE positions in which a PDCCH is to be positioned for each UE. The limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH. For example, if a CRC error is not detected when the PDCCH is de-masked using the C-RNTI, the UE has detected its own PDCCH. The UE-specific search space (USS) is separately configured for each UE and a scope of common search space (CSS) is known to all UEs. The USS and the CSS may be overlapped with each other.

To appropriately control computational load of blind decoding, the UE is not required to simultaneously search for all defined DCI formats. In general, the UE always searches for formats 0 and 1A in USS. Formats 0 and 1A have the same size and are discriminated from each other by a flag in a message. The UE may need to receive an additional format (e.g. format 1, 1B or 2 according to PDSCH transmission mode configured by a base station). The UE searches for formats 1A and 1C in CSS. Furthermore, the UE may be configured to search for format 3 or 3A. Formats 3 and 3A have the same size as that of formats 0 and 1A and may be discriminated from each other by scrambling CRC with different (common) identifiers rather than a UE-specific identifier. A PDSCH transmission scheme and information contents of DCI formats according to a transmission mode will be listed below.

Transmission Mode (TM)
Transmission Mode 1: Transmission from a single eNB antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Single-antenna port (port 5) transmission
Transmission Mode 8: Dual layer transmission (ports 7 and 8) or single-antenna port (port 7 or 8) transmission
Transmission Modes 9 and 10: Layer transmission up to rank 8 (ports 7 to 14) or single-antenna port (port 7 or 8) transmission
DCI Format
Format 0: Resource grant for PUSCH transmission (uplink)
Format 1: Resource allocation for single codeword PUSCH transmission (transmission modes 1, 2, and 7)
Format 1A: Compact signaling of resource allocation for single codeword PDSCH transmission (all modes)
Format 1B: Compact resource allocation for PDSCH (mode 6) using rank-1 closed-loop precoding
Format 1C: Very compact resource allocation for PDSCH (e.g., paging/broadcast system information)
Format 1D: Compact resource allocation for PDSCH (mode 5) using multi-user MIMO
Format 2: Resource allocation for PDSCH (mode 4) of closed-loop MIMO operation
Format 2A: Resource allocation for PDSCH (mode 3) of open-loop MIMO operation
Format 3/3A: Power control command with 2-bit/1-bit power adjustments for PUCCH and PUSCH
Format 4: Resource grant for PUSCH transmission (uplink) in a cell configured in a multi-antenna port transmission mode A UE may be semi-statically configured via higher layer signaling to receive PDSCH data transmission that is scheduled by the PDCCH according to 10 transmission modes.

When a packet is transmitted in a wireless communication system, signal distortion may occur during transmission since the signal is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is referred to as a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals may be classified into a reference signal for acquiring channel information and a reference signal used for data demodulation. The former is for a UE to acquire channel information in downlink, the reference signal for acquiring channel information is transmitted in wideband, and a UE which does not receive downlink data in a specific subframe receives the reference signal. Further, this reference signal is used in a handover situation. The latter is a reference signal transmitted together when a base station transmits a downlink signal, and enables a UE to demodulate the downlink signal using the reference signal. The reference signal used for data demodulation is required to be transmitted in a data transmission region. For example, downlink reference signal includes:

i) a cell-specific reference signal (CRS) shared by all UEs in a cell;
ii) a UE-specific reference signal for a specific UE only;
iii) a demodulation reference signal (DM-RS) transmitted for coherent demodulation when a PDSCH is transmitted;
iv) a channel state information reference signal (CSI-RS) for delivering channel state information (CSI) when a downlink DMRS is transmitted;
v) a multimedia broadcast single frequency network (MB-SFN) reference signal transmitted for coherent demodulation of a signal transmitted in MBSFN mode; and
vi) a positioning reference signal used to estimate geographic position information of a UE.

Figure 6:
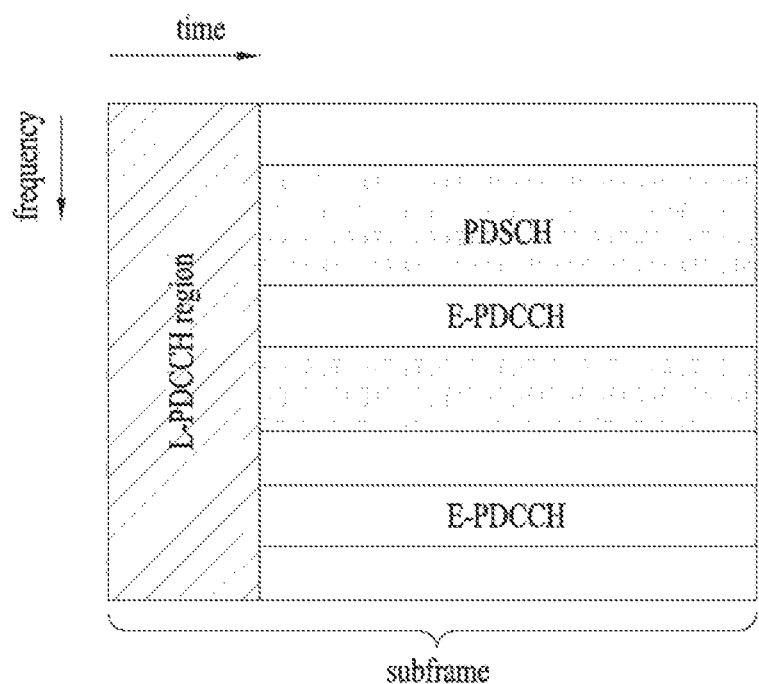
FIG. 6 illustrates an example of allocating E-PDCCH in a subframe.

FIG. 6 illustrates an example of allocating E-PDCCH in a subframe. As described above with reference to FIG. 4 and FIG. 5, first n number of OFDM symbols of a subframe are used to transmit PDCCH, PHICH, PCFICH and the like corresponding to physical channels configured to transmit various control information and the rest of OFDM symbols are used to transmit PDSCH in LTE (-A) system. However, LTE system after LTE release 11 has a limited capability for PDSCH transmission because OFDM symbols are limited due to PDCCH performance decrease resulting from lack of PDCCH capability and inter-cell interference in case of coordinate multi-point (CoMP), multi user-multiple input multiple output (MU-MIMO). Hence, a system (e.g., a system appearing after 3GPP TS 36 series release 11) appearing after LTE (-A) is introducing an enhanced PDCCH (E-PDCCH), which is multiplexed with PDSCH in a data region.

Referring to FIG. 6, a PDCCH (for convenience, legacy PDCCH or L-PDCCH) used in the LTE(-A) system may be allocated to a control region of a subframe. In the figure, an L-PDCCH region refers to a region to which the legacy PDCCH is allocated. In the context, the L-PDCCH region may refer to a control region, a control channel resource region (i.e., a CCE resource) to which a PDCCH can be actually allocated, or a PDCCH search space. A PDCCH may be additionally allocated in a data region (e.g., a resource region for a PDSCH, refer to FIG. 5). The PDCCH allocated to the data region is referred to as an E-PDCCH. As illustrated, a channel resource may be additionally ensured through the E-PDCCH to alleviate scheduling restrictions due to limited control channel resource of an L-PDCCH region.

In detail, the E-PDCCH may be detected/demodulated based on a DM-RS. The E-PDCCH may be configured to be transmitted over a PRB pair on a time axis. In more detail, a search space (SS) for E-PDCCH detection may be configured with one or more (e.g., 2) E-PDCCH candidate sets. Each E-PDCCH set may occupy a plurality of (e.g., 2, 4, or 8) PRB pairs. An enhanced-CCE (E-CCE) constructing an E-PDCCH set may be mapped in the localized or distributed form (according to whether one E-CCE is distributed in a plurality of PRB pairs). In addition, when E-PDCCH based scheduling is configured, a subframe for transmission/detection of an E-PDCCH may be designated. The E-PDCCH may be configured in only a USS. The UE may attempt DCI detection only on an L-PDCCH CSS and an E-PDCCH USS in a subframe (hereinafter, an E-PDCCH subframe) in which E-PDCCH transmission/detection is configured and attempt DCI detection on an L-PDCCH CSS and an L-PDCCH USS in a subframe (non-E-PDCCH subframe) in which transmission/detection of E-PDCCH is not configured.

Like an L-PDCCH, an E-PDCCH carries DCI. For example, the E-PDCCH may carry DL scheduling information and UL scheduling information. An E-PDCCH/PDSCH procedure and an E-PDCCH/PUSCH procedure are the same/similar to in steps S207 and S208 of FIG. 2. That is, a UE may receive the E-PDCCH and receive data/control information through a PDSCH corresponding to the E-PDCCH. In addition, the UE may receive the E-PDCCH and transmit data/control information through a PUSCH corresponding to the E-PDCCH. The LTE(-A) system pre-reserves a PDCCH candidate region (hereinafter, a PDCCH search space) in a control region and transmits a PDCCH of a specific UE to a partial region of the PDCCH candidate region. Accordingly, the UE may acquire a PDCCH of the UE in the PDCCH search space via blind decoding. Similarly, the E-PDCCH may be transmitted over a partial or entire portion of a pre-reserved resource.

In the meantime, in a long term evolution-advanced (LTE-A) system, a multimedia broadcast multicast service single frequency network (MBSFN)-based multimedia broadcast and multimedia service (MBMS) is defined in order to provide a broadcast service over a communication network. An MBSFN is technology for simultaneously transmitting the same data at the same time in all of nodes belonging to an MBSFN area in synchronization with a radio resource. Here, the MBSFN area refers to an area covered by one MBSFN. According to the MBSFN, even when the UE is located at an edge of coverage of a node that the UE has accessed, a signal of a neighboring node functions not as interference but as gain. That is, the MBSFN introduces a single frequency network (SFN) function for MBMS transmission, thereby reducing service interference caused by frequency switching in the middle of MBMS transmission. Therefore, the UE within the MBSFN area recognizes MBMS data transmitted by multiple nodes as data transmitted by one node and in this MBSFN area, the UE may receive a seamless broadcast service without an additional handover procedure even while in motion. In the MBSFN, since a plurality of nodes use a single frequency in order to simultaneously perform synchronized transmission, frequency resources can be saved and spectrum efficiency can be raised.

Meanwhile, in a 3GPP LTE(-A) system (e.g., Release-8, 9, or 10), a CRS and a control channel such as a PCFICH/PDCCH/PHICH may be transmitted in every DL subframe of a carrier, except a DL subframe configured for a special purpose (e.g., as an MBSFN subframe). The CRS may be allocated across OFDM symbols of a subframe and the control channel such as a PCFICH/PDCCH/PHICH may be allocated to some starting OFDM symbols of a subframe in time. The CRS and the control channels may ensure backward compatibility for legacy UEs in terms of connection and service provisioning. However, it may be difficult to overcome inter-cell interference, improve carrier extension, and provide advanced features, while maintaining backward compatibility with the legacy LTE system. Accordingly, introduction of a new carrier, subframe, or TM structure that supports none or a part of the afore-described backward compatible signals/channels may be considered in order to provide various advanced features compared to the legacy LTE system, in a next-release system. A carrier type that is not compatible with the legacy LTE system may be referred to as a New Carrier Type (NCT), and a carrier compatible with the legacy LTE(-A) system may be referred to as a Legacy Carrier Type (LCT).

Figure 7:
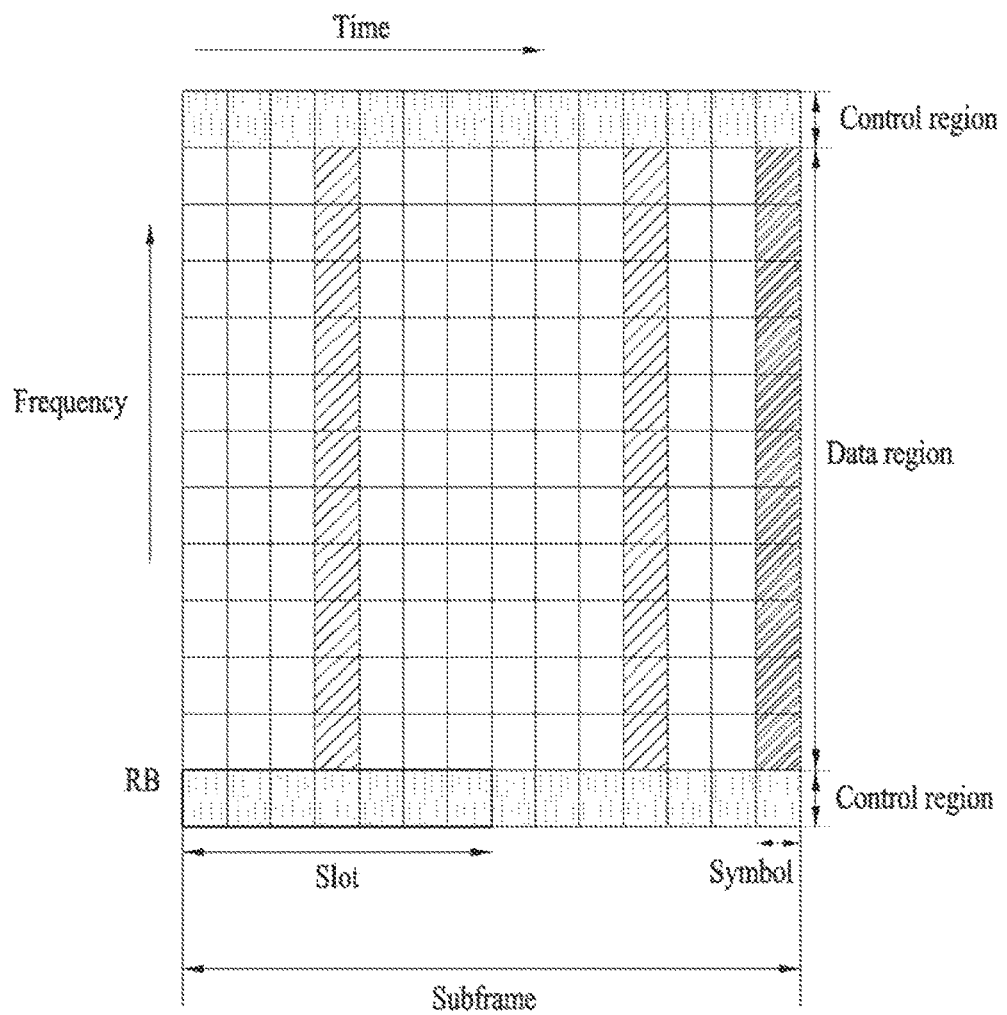
FIG. 7 illustrates a structure of an uplink subframe.

FIG. 7 illustrates a structure of an uplink subframe.

Referring to FIG. 7, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP, and a slot may comprise 6 SC-FDMA symbols in case of extended CP. An uplink subframe is divided into a data region and a control region. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis (e.g. RB pair located frequency mirrored positions), and performs hopping on the border of the slots. The uplink control information (UCI) includes HARQ ACK/NACK, CQI (Channel Quality Indicator), a precoding matrix indicator (PMI), a rank indicator (RI), etc.

SRS (Sounding Reference Signal) is transmitted at the last SC-FDMA symbol of a subframe. SRS may be transmitted periodically, or may be transmitted aperiodically according to a request of a base station. Periodic SRS transmission is defined by a cell-specific parameter and a UE-specific parameter. The cell-specific parameter notifies an entire subframe set (hereinafter, cell-specific SRS subframe set) available for SRS transmission within a cell, and the UE-specific parameter notifies a subframe sub-set (hereinafter, UE-specific SRS subframe set) actually allocated to a UE within the entire subframe set.

A legacy LTE (Rel-8/9) and LTE-A (Rel-10/11) system may schedule only one DL/UL data from one DL/UL grant downlink control information (DCI) and employs a scheme of transmitting corresponding DL/UL data through one DL/UL subframe (i.e., a SF). In this specification, this scheduling method may be referred to as a single-SF scheduling. A future system may consider a multi-SF scheduling method for simultaneously scheduling a plurality of DL/UL data from one DL/UL grant DCI in order to enhance spectral efficiency, and in the multi-SF scheduling method, the plurality of corresponding DL/UL data may be configured to be sequentially transmitted through a plurality of DL/UL SFs.

The present invention proposes a control signaling method for multi-SF scheduling. In detail, the present invention proposes DL related configuration method and a DCI transmitting method for multi-SF scheduling according to a radio frame type (e.g., FDD or TDD). First, for convenience of description of the present invention, terms used in the specification are defined as follows.

multi-SF window: K (e.g., K>1) subframes (SFs) directed to multi-SF scheduling
multi-SF DCI: DCI scheduling a multi-SF window
starting SF: a subframe (SF) in which multi-SF DCI is detected/received (or a specific SF after multi-SF DCI is detected/received)
indicated O-SF: a specific subframe (SF) that is directly indicated from multi-SF DCI (as a target to which scheduling is not applied)

For convenience of description, although the present invention has been described in terms of downlink multi-SF scheduling, the present invention may be applied to uplink multi-SF scheduling in the same way.

A multi-SF window may include K consecutive subframes (SFs) including a starting SF. In this case, the K consecutive subframes may have one SF interval or one or more H (e.g., H>1) SF interval. For example, when two consecutive subframes include SF #n and SF #n+1, it may be said that the two consecutive subframes have one subframe (SF) interval. As another example, when two consecutive subframes include SF #n and SF #n+2, it may be said that the two consecutive subframes have a two SF interval.

In this case, the multi-SF window may include K consecutive SFs (or the remaining K or less SFs except for an indicated O-SF there among) except for SFs (all or some SFs) having the following special purpose or specific aspect from a starting SF, and such a scheme may be referred to as "SF-skipping". Alternatively, the multi-SF window may include only the remaining K or less SFs except for SFs (all or some SFs) having the following special purpose or specific aspect and/or an indicated O-SF among K consecutive SFs from a starting SF, and such a scheme may be referred to as "SF-omitting". For example, a SF having the following special purpose or specific aspect may refer to a SF corresponding to at least one of ① to ⑩ and may be referred to as "special X-SF" in this specification.

① SF configured for a multicast-broadcast single-frequency network (MBSFN) and/or SF configured to detect/receive a physical multicast channel (PMCH). The PMCH refers to a physical channel for carrying a multicast data signal.

② SF in which a physical broadcast channel (PBCH) and/or (specific) system information block (SIB) and/or a paging signal are transmitted. In detail, the SF may correspond to the special X-SF only when a resource region allocated through multi-SF DCI is overlapped with a resource (e.g., a resource block (RB)) occupied by a PBCH and/or a (specific) SIB and/or a paging signal. The PBCH refers to a physical channel for carrying a broadcast data signal.

③ SF in which a synchronization signal such as a primary synchronization signal (PSS) and/or a secondary synchronization signal (SSS) is transmitted. In detail, the SF may correspond to the special X-SF only when a resource region allocated through multi-SF DCI is overlapped with a resource (e.g., a resource block (RB)) occupied by a synchronization signal such as a PSS and/or a SSS. The PSS may be transmitted through a P-SCH and the SSS may be transmitted through the S-SCH.

④ SF in which transmitted PDSCH/PUSCH scheduling without corresponding PDCCH/EPDCCH is performed (or reserved). For example, SF in which data transmission and reception is performed based on scheduling based on semi-persistent scheduling (SPS).

⑤ SF that performs (or is configured to be available for) PRACH transmission.

⑥ SF that performs (or is configured to perform) positioning reference signal (PRS) transmission.

⑦ All or specific TDD special SF (a downlink period (e.g., DwPTS) of which is configured with L or less symbols and/or in which DMRS is not transmitted). For example, L may be 3.

⑧ SF that perform (or is configured to perform) transmission of a common RS for synchronization tracking and/or a discovery signal for cell/UE in a new carrier type (in which CRSs are not consecutively transmitted). In detail, the SF may correspond to only the case in which a resource region allocated through multi-SF DCI is overlapped with a resource (e.g., a resource block (RB)) occupied by a common RS for tracking and/or a discovery signal.

⑨ SF that does not transmit (or is configured not to transmit) DMRS.

⑩ SF that performs (or is configured to perform) transmission of non-zero power and/or zero-power CSI-RS).

A legacy single-SF scheduling method may be applied to an entire or specific partial portion of a special X-SF or an indicated O-SF.

When an interval between an SF in which multi-SF DCI is detected/received and a corresponding starting SF is S, K (and/or H) and/or S may be pre-set through high layer signaling (e.g., RRC signaling) and so on (e.g., K>1, H≥1, S≥0). In addition, whether a multi-SF window configured with K SFs is scheduled or one subframe (SF) is scheduled as a target of scheduling of the corresponding DCI may be signaled through the multi-SF DCI.

FIG. 8 illustrates a multi-SF scheduling method according to the present invention. FIG. 8(A) illustrates a multi-SF scheduling method according to a SF-skipping method, and FIG. 8(B) illustrates a multi-SF scheduling method according to a SF-omitting method.

Referring to FIGS. 8(A), K, H, and S may be pre-configured through high layer signaling (e.g., RRC signaling) and so on. Multi-SF DCI may be detected/received in a subframe SF #n and may include information indicating that a multi-SF window comprising K SFs is scheduled. In this case, the multi-SF window may start from a SF #(n+S) and may have an interval H. In the example of FIG. 8(A), a $m^{th}$ subframe SF #(n+S+(m−1)*H) in the multi-SF window may correspond to a special-X SF and/or an indicated-O SF. In this case, according to the SF-skipping method, the multi-SF window may include K subframes except for subframes corresponding to the special-X SF and/or the indicated-O SF. Accordingly, in the example of FIG. 8(A), the multi-SF window may include subframes from SF #(n+S) to SF #(n+S+K*H) with an interval H except for SF #(n+S+(m−1)*H).

On the other hand, referring to FIG. 8(B), the multi-SF window may include K subframes including a $m^{th}$ subframe SF #(n+S+(m−1)*H) in the multi-SF window. Accordingly, according to the SF-omitting method, the multi-SF window may include subframes from SF #(n+S) to SF #(n+S+(K−1)*H) with an interval H including SF #(n+S+(m−1)*H).

Although the case in which S and H are pre-configured via high layer signaling has been described thus far, S or H may be fixed to a specific value. For example, S may be fixed to a specific integer equal to or greater than 0, and only K and H may be configured through high layer signaling (e.g., RRC signaling). As another example, H may be fixed to a specific integer equal to or greater than 1, and only K and S may be configured via high layer singling (e.g., RRC signaling). As another example, K and H may be fixed to a specific integer equal to or greater than 0, and a specific integer equal to or greater than 1 and only K may be configured via high layer signaling (e.g., RRC signaling).

Figure 9:
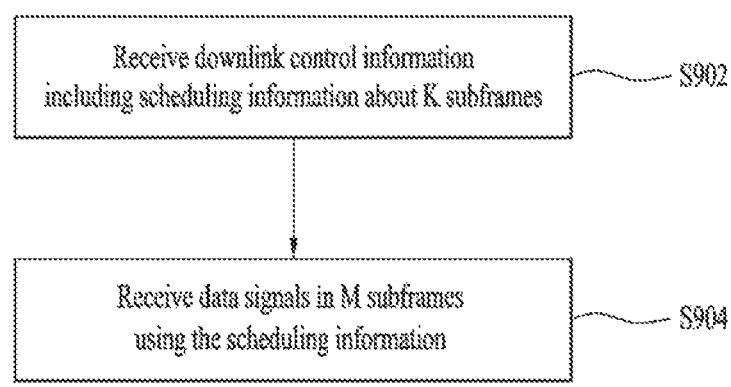
FIG. 9 illustrates a flowchart of a method for receiving data according to the present invention.

FIG. 9 illustrates a flowchart of a method for receiving data according to the present invention.

Referring to FIG. 9, in S902, a UE may detect/receive downlink control information including scheduling information about a plurality of subframes. The number of the plurality of subframes may be indicated by K (e.g., K>1). The downlink control information may be detected/received through a physical downlink control channel.

When at least one of the plurality of subframes is a special X-SF (e.g., a subframe corresponding to at least one of ① to ⑩), the scheduling information may not be applied to the at least one subframe. Accordingly, in this case, a reception operation of a data signal using the scheduling information may be omitted. Similarly, when at least one subframe among the plurality of subframes corresponds to an indicated-O SF, the scheduling information may not be applied to the at least one subframe. Accordingly, in this case, a reception operation using the scheduling operation may also be omitted. A subframe in which the reception operation of the data signal using the scheduling information is omitted may be referred to as an omitted subframe, for convenience.

In S904, the UE may receive a data signal using the scheduling information in M subframes except for the omitted subframe. In this case, M may be equal to or less than K according to whether the omitted subframe is present.

In FIG. 9, when the SF-skipping method is applied, the scheduling information may be applied to K subframes (or data signals received/detected from K subframes) except for the omitted subframe. Alternatively, when the SF-omitting method is applied, the scheduling information may be applied to M subframes (or data signals received/detected from M subframes) except for the omitted subframe. When the SF-omitting method is applied, M may have a value smaller than K.

Different HARQ process numbers may be allocated to data signals scheduled by the multi-SF DCI. A plurality of parallel HARQ processes for UL/DL transmission are present in the UE. The plurality of parallel HARQ processes may be performed by consecutively performing UL/DL transmission while waiting for HARQ feedback with respect to successful or non-successful reception of previous UL/DL transmission. Each HARQ process is associated with a HARQ buffer of a medium access control (MAC) layer. Each HARQ process manages a state variable related to a transmission number of times of MAC physical data block (PDU) in a buffer, HARQ feedback with respect to the MAC PDU in the buffer, a current redundancy version, and so on. For example, in the case of LTE(-A) FDD, the number of HARQ processes for a non-subframe bundling operation (i.e., a general HARQ operation) is 8. In the case of LTE(-A) TDD, since the number of subframes is varied according to a UL-DL configuration, the number of HARQ processes and HARQ round trip time (RTT) are also configured to be varied according to a UL-DL configuration. Here, the HARQ RTT may refer to a time interval (e.g., a unit of SF or ms) from a reception time point of UL grant to a reception time point of a (corresponding) PHICH through (corresponding) PUSCH transmission, or a time interval from a transmission time point of a PUSCH to a corresponding retransmission time point.

In order to signal K HARQ process numbers (or HARQp nums) allocated to K data scheduled through multi-SF DCI, one of the following methods may be applied.

Alt-1) K HARQ process numbers (HARQp nums) for multi-SF scheduling are pre-allocated via high layer signaling (e.g., RRC signaling) and so on.

Alt-2) The K HARQ process numbers (HARQp nums) are directly allocated through a legacy HARQ process number (HARQp num) field in the multi-SF DCI or a combination of specific fields including the legacy HARQ process number (HARQp num) field or by adding a new field to the multi-SF DCI.

In Alt-2, when the K HARQ process numbers (HARQp nums) for multi-SF scheduling are allocated using the legacy HARQ process number (HARQp num) field, K cyclically consecutive HARQ process numbers (HARQp nums) may be allocated. For example, assuming that a value signaled through the HARQ process number (HARQp num) field is P, the K cyclically consecutive HARQp nums may be allocated using the following method.

HARQ process number (HARQp num) allocated to a first SF (or data): (P) mod maxHARQp HARQ process number (HARQp num) allocated to a second SF (or data): (P+1) mod maxHARQp

. . .

HARQ process number (HARQp num) allocated to a $K^{th}$ SF (or data): (P+K−1) mod maxHARQp In the above method, maxHARQp may refer to a maximum number of HARQ processes (HARQp) (supportable by a UE), the number of receive buffers of HARQ process (HARQp), or the number of HARQ processes (HARQp) determined for multi-SF scheduling. Accordingly, the HARQ process number (HARQp num) may have a value from 0 to (maxHARQp−1). In addition, in the above method, mod refers to modulo operation.

In Alt-2, when the HARQ process number (HARQp num) for multi-SF scheduling is allocated using a combination of specific fields in the multi-SF DCI or using a newly added field, K HARQ process numbers (HARQp nums) may be signaled using a combinatorial index. Here, the HARQ process number (HARQp num) may be assumed to have a value from 1 to maxHARQp.

Assuming that a set $\{k_i\}_{i=0}^{K-1}$, ($1 \leq k_i \leq$ maxHARQp, $k_i < k_{i+1}$) has K aligned HARQp numbers and $$\begin{pmatrix} x \\ y \end{pmatrix} = \begin{cases} \begin{pmatrix} x \\ y \end{pmatrix} & x \geq y \\ 0 & x < y \end{cases},$$

indicates a extended binomial coefficient, K selected HARQp numbers are indicated using a combinatorial index r defined as $$r = \sum_{i=0}^{K-1} \begin{pmatrix} \text{maxHARQp} - k_i \\ K - i \end{pmatrix} \text{ and } r \in \left\{0, \ldots, \begin{pmatrix} \text{maxHARQp} \\ K \end{pmatrix} - 1\right\}$$

has a unique value for the K selected HARQp numbers (K selected HARQp numbers using a combinatorial index r defined as $$r = \sum_{i=0}^{K-1} \begin{pmatrix} \text{maxHARQp} - k_i \\ K - i \end{pmatrix},$$

where the set $\{k_i\}_{i=0}^{K-1}$, ($1 \leq k_i \leq \text{maxHARQp}$, $k_i < k_{i+1}$) contains the K sorted HARQp numbers and $$\begin{pmatrix} x \\ y \end{pmatrix} = \begin{cases} \begin{pmatrix} x \\ y \end{pmatrix} & x \geq y \\ 0 & x < y \end{cases},$$

is the extended binomial coefficient, resulting in unique label $$r \in \left\{0, \ldots, \begin{pmatrix} \text{maxHARQp} \\ K \end{pmatrix} - 1\right\}).$$

That is, the set $\{k_i\}_{i=0}^{K-1}$ of the K HARM process numbers may be uniquely represented by a combinatorial index $$r = \sum_{i=0}^{K-1} \begin{pmatrix} \text{maxHARQp} - k_i \\ K - i \end{pmatrix}.$$

A binominal coefficient $$\begin{pmatrix} x \\ y \end{pmatrix}$$

may be represented by xCy.

Figure 10:
FIG. 10 illustrates an example of allocating HARQ process numbers using a combinatorial index.

FIG. 10 illustrates an example of allocating HARQ process numbers using a combinatorial index. FIG. 10 illustrates, but is not limited to, an example in which max-HARQp is 10 and K=4. In FIG. 10, a binominal coefficient is represented by comb(x, y).

Referring to FIG. 10, a set {2, 3, 5, 8} of HARQ process numbers may be uniquely represented by a combinatorial index $$r = \sum_{i=0}^{K-1} \begin{pmatrix} \text{maxHARQp} - k_i \\ K - i \end{pmatrix}.$$

In the example of FIG. 10, since maxHARQp=10 and K=4, the set may be uniquely represented by $r = {}_8C_4 + {}_7C_3 + {}_5C_2 + {}_2C_1 = 70 + 35 + 10 + 2 = 117$. A set having other HARQ process numbers as elements may be uniquely represented by another combinatorial index.

In Alt-2, when a HARQ process number (HARQp num) for multi-SF scheduling is allocated using a combination of specific fields in a multi-SF DCI, the combination of specific fields may consider the following method.

Sol-1) HARQ Process Number (HARQp Num) Field+ Redundancy Version (RV) Field.

This method may be applied to TM-common DCI (e.g., DCI format 1A) for scheduling only maximum one transport block (TB) per SF. In detail, while a RV pattern for initial transmission and retransmission of multi-SF scheduled data is pre-configured (via high layer signaling (e.g., RRC signaling) and so on), a HARQ process number (HARQp num) field in DCI format and an RV field may be combined to allocate the HARQ process number (HARQp num) for the multi-SF scheduled data. In this case, since the RV pattern is pre-configured, the RV field indicating RV may be used to allocate the HARQ process number (HARQp num).

Sol-2) HARQ Process Number (HARQp Num) Field+ MCS and/or RV Field.

This method may be applied to TM-dedicated DCI (e.g., DCI format 2C/2D) for scheduling maximum two transport blocks (TBs) per SF. For example, when HARQp num/ MCS/RV fields corresponding to TB1 and TB2 in DCI format are referred to as HARQ1/MCS1/RV1 and HARQ2/ MCS2/RV2, respectively, MCS and/or RV values signaled through MCS1 and/or RV1 fields may be commonly applied in the same way to a plurality of multi-SF scheduled transport blocks (TBs), and HARQ1/HARQ2 fields and MCS2 and/or RV2 fields may be combine to allocate HARQp num for a plurality of multi-SF scheduled transport blocks TBs. As another example, MCS and/or RV values signaled through MCS2 and/or RV2 fields may be commonly applied in the same way to a plurality of multi-SF scheduled transport blocks (TBs), and HARQ1/HARQ2 fields and MCS1 and/or RV1 fields may be combined to allocate HARQp num for a plurality of multi-SF scheduled transport blocks TBs.

When the SF-skipping method, the SF-omitting method, or the like is applied, only M (M<K) SFs/data may be scheduled through the multi-SF DCI. In this case, only M HARQ process numbers (HARQp nums) may be selected and allocated among K HARQ process numbers (HARQp nums) determined by applying the above methods (Alt-1 or Alt-2). As a first example, M specific HARQ process numbers (HARQp nums) among K HARQ process numbers (HARQp nums) may be sequentially allocated to M SFs/ data. In more detail, HARQ process numbers (HARQp nums) corresponding to first to $M^{th}$ SFs/data among K HARQ process numbers may be sequentially allocated. As a second example, the remaining M HARQ process numbers (HARQp nums) except for HARQ process numbers (HARQp nums) corresponding to (K−M) omitted SFs among K HARQ process numbers (HARQp nums) may be sequentially allocated.

FIG. 11 illustrates an example of allocating a HARQ process when an omitted SF is present. FIG. 11 assumes, but is not limited to, an example in which K=4 and a third subframe corresponds to an omitted SF. Accordingly, in the example of FIG. 11, it is assumed that M=3.

Referring to FIG. 11(A), according to the first example, M HARQ process numbers (HARQp nums) among K HARQ process numbers (HARQp nums) may be sequentially allocated. For example, when a set of four HARQ process numbers (HARQp nums) is determined as {1, 2, 3, 4}, HARQ process numbers (HARQp nums) 1, 2, and 3 corresponding to first to third SFs/data may be sequentially allocated to subframes except for the omitted SF. A HARQ process number (HARQp num) of a last subframe in the multi-SF window may be 3.

Referring to FIG. 11(B), according to the second example, M HARQ process numbers (HARQp nums) among K HARQ process numbers (HARQp nums) may be sequentially allocated. For example, when a set of 4 HARQ process numbers (HARQp nums) is determined as {1, 2, 3, 4}, three HARQ process numbers (HARQp nums) 1, 2, and 4 corresponding to first, second, and fourth SFs (or data) except for a HARQ process number (HARQp num) 3 corresponding to the omitted SF may be allocated to subframes in the multi-SF window. Accordingly, a HARQ process number (HARQp num) of a last subframe in the multi-SF window may be 4.

A field configuration and/or size, etc. of the multi-SF DCI may be configured differently from legacy DCI format through the above method or other methods. Accordingly, in order to prevent a increase of blind decoding due to the difference and/or allow an appropriate interpretation of multi-SF DCI fields, a SF in which a blind decoding (BD) is to be performed on the multi-SF DCI may be signaled through high layer signaling (e.g., RRC signaling) and so on. In detail, when detection/reception of the multi-SF DCI is successful, BD may be applied according to one of the following methods with respect to a multi-SF window period corresponding to the corresponding DCI (except for the SF in which the corresponding DCI is detected/received).

A-1) BD may be omitted.

A-2) BD may be performed on DCI (single-SF DCI) for performing single-SF scheduling. In this case, when the single-SF DCI is detected/received in a multi-SF scheduled multi-SF window, a method A-2-1 or A-2-2 may be applied.

A-2-1) Only data corresponding to a SF in which corresponding DCI is detected/received in the multi-SF window may be replaced to be scheduled through the corresponding DCI.

A-2-2) Data corresponding to a SF in which corresponding DCI is detected/received in the multi-SF window may be replaced to be scheduled through the corresponding DCI and a detection/reception operation of data corresponding to a next SF may be omitted. In the case of A-2-2, when separate additional DCI detection/reception for scheduling a next SF is not present, an A/N response corresponding thereto may be processed as DTX or NACK.

In A-2-1 and A-2-2, the operation in which "data corresponding to a SF in which a single subframe (single-SF) DCI is detected/received in the multi-SF window is replaced to be scheduled through the corresponding DCI" may refer to performing detection/reception of data scheduled from single-SF DCI instead of omission of detection/reception of data scheduled from multi-SF DCI in the corresponding SF. For convenience of description, when a HARQ process number (HARQp num) allocated to an SF through multi-SF DCI/scheduling is referred to as "mHARQp num" and a HARQ process number (HARQp num) allocated to a corresponding SF through single-SF DCI/scheduling is referred to as "sHARQp num", the operation may refer to storing/combining of corresponding data to a receive buffer corresponding to the sHARQp num without storing/combining of the corresponding data to a receive buffer corresponding to the mHARQp num.

Similarly, in A-2-1 and A-2-2, an operation in which "detection/reception of data corresponding to SF(s) after a time point for detection/reception of single-SF DCI is omitted" may refer to an operation in which detection/reception of data scheduled from multi-SF DCI in the corresponding SF(s) is omitted. That is, the operation may refer to an operation in which corresponding data is not stored/combined in a receive buffer corresponding to mHARQp num allocated to corresponding SF(s).

While EPDCCH-based scheduling is configured, a situation in which other DCI is detected/received through an EPDCCH region overlapped with a DL data region scheduled from multi-SF DCI in a specific SF in a multi-SF window may be considered. In this case, when the DCI detected/received through the EPDCCH region overlapped with the DL data region scheduled from the multi-SF DCI is DL grant, the above operation (A-1 or A-2) may be applied.

On the other hand, when the DCI detected/received through the EPDCCH region overlapped with the DL data region scheduled from the multi-SF DCI is UL grant, application of one of the following methods may be considered.

B-1) A detection/reception operation may be omitted with respect to only DL data corresponding to an SF in which corresponding DCI is detected/received in the multi-SF window (an A/N response corresponding thereto may be processed as DTX or NACK).

B-2) A detection/reception operation may be omitted with respect to all DL data corresponding to next SFs including a SF in which the corresponding DCI is detected/received in the multi-SF window (an A/N response corresponding thereto may be processed as DTX or NACK when separate additional detection/reception for scheduling the corresponding SF is not present).

B-3) A UE may operate with considering/assuming that UL grant (and/or DL grant) is not transmitted/received through an EPDCCH region overlapped with a DL data region scheduled from multi-SF DCI. Alternatively, BD may be omitted with respect to the corresponding overlapped region.

B-4) A UL grant region may be punctured or rate-matched to transmit and receive DL data.

In a situation in which EPDCCH-based scheduling is configured, if a region of DL data (e.g., SPS PDSCH) transmitted without corresponding PDCCH/EPDCCH and an EPDCCH region are overlapped, the same/similar principle of B-1 to B-4 may also be applied during a detection/reception operation of DL data associated with the corresponding overlapped region and DCI.

In a situation in which multi-SF scheduling and single-SF scheduling are selectively applied according to a SF, A/N feedback with respect to a multi-SF scheduled multi-SF window may have a remarkably increased payload/codebook size compared with A/N feedback corresponding to single-SF scheduling. Accordingly, in order to prevent coverage loss due to this, it may be necessary to increase PUCCH transmission power by a large amount. To this end, when multi-SF scheduling is configured, one of the following methods may be applied to TPC signaled through multi-SF DCI (and/or single-SF DCI).

C-1) A legacy TPC field size (the number of TPC values) may be maintained and a magnitude of a (entire or partial) legacy TPC value may be increased.

C-2) A method for increasing a TPC field size (the number of TPC values) and additionally defining a TPC value (except for a legacy TPC value) having a greater magnitude than the legacy TPC value may be considered.

Multi-SF scheduling through a common search space (CSS) and/or using TM-common DCI (e.g., DCI format 0/1A) may not be permitted. One of the following methods may be applied to an aperiodic SRS request field and/or an aperiodic CSI request field.

D-1) The field may be interpreted/used for allocation of a HARQ process number (HARQp num) for the multi-SF scheduling. In this case, the aperiodic SRS/CSI request through the multi-SF DCI may not be permitted.

D-2) Aperiodic SRS/CSI request through the multi-SF DCI may be permitted and SRS transmission time point/CSI reporting time point corresponding thereto may be determined based on only a SF in which corresponding DCI is detected/received. In this case, when aperiodic SRS/CSI request is received through a corresponding SF, the UE may operate in the same way as in a legacy case in which general single-SF DCI is detected/received. For example, aperiodic CSI reporting may be performed (e.g., only once) through an initial SF in a multi-SF window corresponding to corresponding multi-SF DCI (including aperiodic CSI request). In addition, for example, aperiodic SRS transmission may be performed (e.g., only once) through an initial UE-specific aperiodic SRS SF set after a SF (or a time point after several SFs from the SF) in which corresponding multi-SF DCI (including aperiodic SRS request) is detected/received.

Although the present invention has been described in terms of a DL data signal, the present invention may also be applied in the same/similar way to multi-SF scheduling with respect to a UL data signal. For example, a multi-SF window configuration, a multi-SF DCI BD procedure, a RRC/DCI signaling method, and so on may be similarly extended/modified to be applied to multi-SF scheduling of a UL data signal.

Some (e.g., a multi-SF window configuration and so on) of the methods proposed according to the present invention may also be applied in the same/similar way to a situation applying a multi-SF scheduling method in which one DL/UL data signal (e.g., the same data signal) scheduled from one DL/UL grant DCI is repeatedly transmitted over a plurality of specific DL/UL SFs in order to enhance cell coverage.

Figure 12:
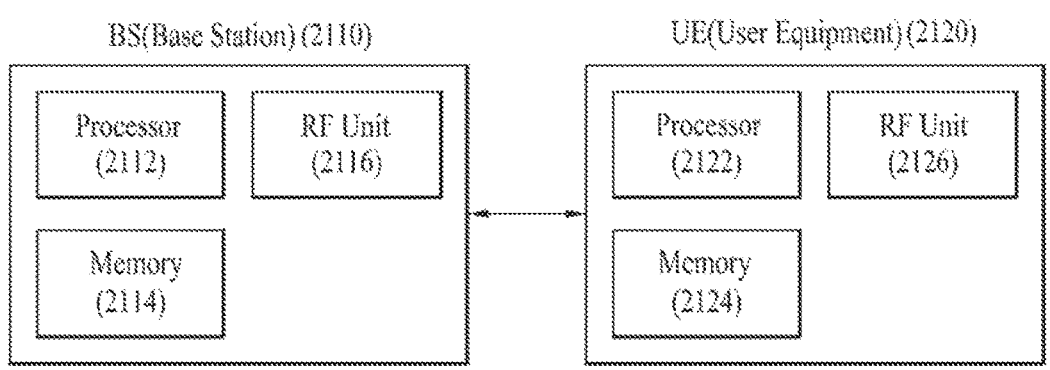
FIG. 12 illustrates a base station and a user equipment to which the present invention is applicable.

FIG. 12 illustrates a base station and a user equipment to which the present invention is applicable.

Referring to FIG. 12, a wireless communication system includes the BS 1210 and the UE 1220. When the wireless communication system includes a relay, the BS 1210 or the UE 1220 may be replaced with the relay.

The BS 1210 includes a processor 1212, a memory 1214, and a radio frequency (RF) unit 1216. The processor 1212 may be configured to embody the procedures and/or methods proposed by the present invention. The memory 1214 is connected to the processor 1212 and stores various pieces of information associated with an operation of the processor 1212. The RF unit 1216 is connected to the processor 1212 and transmits/receives a radio signal. The UE 1220 includes a process 1222, a memory 1224, and an RF unit 1226. The processor 1222 may be configured to embody the procedures and/or methods proposed by the present invention. The memory 1224 is connected to the processor 1222 and stores various pieces of information associated with an operation of the processor 1222. The RF unit 1226 is connected to the processor 1222 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention is applicable to a wireless communication apparatus such as a user equipment (UE), a base station (BS), etc.

What is claimed is:

1. A method for receiving a signal by a user equipment in a wireless communication system, the method comprising:

detecting downlink control information (DCI) within a subframe indicated by a radio resource control (RRC) layer signal; and receiving, based on the DCI, a data signal in K consecutive subframes other than at least one subframe including a subframe transmitting a physical broadcast channel (PBCH), a subframe transmitting a synchronization signal, and a subframe transmitting system information, wherein K is greater than 1, and wherein the DCI is not applied to the at least one subframe.

2. The method according to claim 1, wherein the at least one subframe further includes a subframe configured for a multicast-broadcast single-frequency network (MBSFN), or a subframe configured to transmit a paging signal, or a subframe configured to perform semi-persistent scheduling, or a subframe configured to enable transmission of a physical random access channel (PRACH), or a subframe configured not to transmit a demodulation reference signal (DMRS), or a subframe configured to transmit a channel state information-reference signal (CSI-RS), or a subframe configured to receive a physical multicast channel (PMCH), or a subframe transmitting a positioning reference signal (PRS), or a subframe comprising a downlink period, a guard period, and an uplink period.

3. The method according to claim 1, wherein the DCI indicates whether the DCI is applied to the K consecutive subframes or one subframe.

4. The method according to claim 1, wherein the synchronization signal includes a primary synchronization signal (PSS) and a secondary synchronization signal (SSS).

5. The method according to claim 1, wherein the DCI is detected through a physical downlink control channel.

6. The method according to claim 1, wherein each of the data signals is received through a physical downlink shared channel.

7. The method according to claim 1, wherein different hybrid automatic repeat request (HARQ) process numbers are allocated to the data signals.

8. The method according to claim 1, wherein, when another DCI is detected in one subframe of the K subframes, another data signal is received according to the another DCI in the one subframe.

9. A user equipment operating in a wireless communication system, the user equipment comprising:
a transceiver; and
a processor configured to:
  detect downlink control information (DCI) within a subframe indicated by a radio resource control (RRC) layer signal, and
  control the transceiver to receive, based on the DCI, data signals in K consecutive subframes other than at least one subframe including a subframe transmitting a physical broadcast channel (PBCH), a subframe transmitting a synchronization signal, and a subframe transmitting system information,
wherein K is greater than 1, and
wherein the DCI is not applied to the at least one subframe.

10. The user equipment according to claim 9, wherein the at least one subframe further includes subframe configured for a multicast-broadcast single-frequency network (MBSFN), or a subframe configured to transmit a paging signal, or a subframe configured to perform semi-persistent scheduling, or a subframe configured to enable transmission of a physical random access channel (PRACH), or a subframe configured not to transmit a demodulation reference signal (DMRS), or a subframe configured to transmit a channel state into signal (CSI-RS), or a subframe configured to receive a physical multicast channel (PMCH), or a subframe transmitting a positioning reference signal (PRS), or a subframe comprising a downlink period, a guard period, and an uplink period.

11. The user equipment according to claim 9, wherein the DCI indicates whether the DCI is applied to the K consecutive subframes or one subframe.

12. The user equipment according to claim 9, wherein the synchronization signal includes a primary synchronization signal (PSS) and a secondary synchronization signal (SSS).

13. The user equipment according to claim 9, wherein the DCI is detected through a physical downlink control channel.

14. The user equipment according to claim 9, wherein each of the data signals is received through a physical downlink shared channel.

15. The user equipment according to claim 9, wherein different hybrid automatic repeat request (HARQ) process numbers are allocated to the subframes other than the at least one subframe.

16. The user equipment according to claim 9, wherein, when another DCI is detected in one subframe of the K subframes, another data signal is received according to the another DCI in the one subframe.

* * * * *